United States Patent
Cherry (10) Patent No.: US 12,408,779 B2
(45) Date of Patent: Sep. 9, 2025

(54) GLASS WITH ATTACHED JEWEL

(71) Applicant: Two Jewels, LLC, Chesterfield, MO (US)

(72) Inventor: Candice Cherry, Wildwood, MO (US)

(*) Notice: Subject to any disclaimer, the term of this patent is extended or adjusted under 35 U.S.C. 154(b) by 165 days.

(21) Appl. No.: 18/300,206

(22) Filed: Apr. 13, 2023

(65) Prior Publication Data
US 2023/0248164 A1    Aug. 10, 2023

Related U.S. Application Data (63) Continuation-in-part of application No. 16/705,739, filed on Dec. 6, 2019, now abandoned, which is a continuation of application No. 15/633,990, filed on Jun. 27, 2017, now Pat. No. 10,531,752.

(51) Int. Cl.
| | |
|---|---|
| *A47G 19/22* | (2006.01) |
| *B65D 23/14* | (2006.01) |
| *B65D 25/20* | (2006.01) |
| *C09J 5/00* | (2006.01) |
| *C09J 5/02* | (2006.01) |
| *C09J 201/00* | (2006.01) |

(52) U.S. Cl.
CPC ......... *A47G 19/2227* (2013.01); *B65D 23/14* (2013.01); *B65D 25/205* (2013.01); *C09J 5/00* (2013.01); *C09J 5/02* (2013.01); *C09J 201/00* (2013.01); *C09J 2301/416* (2020.08); *C09J 2400/143* (2013.01); *C09J 2400/146* (2013.01)

(58) Field of Classification Search
CPC ..... C09J 5/00; C09J 5/02; C09J 201/00; C09J 2301/416; A47G 19/2227; B65D 23/12; B65D 23/14; B65D 25/205
See application file for complete search history.

(56) References Cited

U.S. PATENT DOCUMENTS

| | | | | |
|---|---|---|---|---|
| 2,596,965 | A * | 5/1952 | Troy | D06C 29/00 63/26 |
| 2,744,649 | A * | 5/1956 | Smith | B65D 23/12 215/390 |
| 5,024,014 | A * | 6/1991 | Swierczek | G09F 3/10 206/217 |
| 7,014,061 | B2 * | 3/2006 | Hoffbauer | A47G 19/2227 362/311.15 |
| 8,920,592 | B2 * | 12/2014 | Suwa | B32B 37/1207 156/275.5 |
| 11,298,630 | B2 * | 4/2022 | Guarino | B65D 23/08 |

(Continued)

*Primary Examiner* — Chun Hoi Cheung
(74) *Attorney, Agent, or Firm* — Charles McCloskey (57) ABSTRACT

A glass with attached jewel device has an item of drinkware such as a glass, optically clear adhesive, and a jewel piece. The glass has a base, a wall extending up from the base, and a rim opposite the base. The wall curves upon two axes with different radii. The piece fits upon the curved wall and the adhesive adheres the piece to the wall. The piece has an outer surface and an opposite inner surface. The inner surface has at least three pads and a plurality of dimples that receive the adhesive and provide additional surface area making for a strong bond of the piece to the glass or drinkware. The adhesive fills the gap upon the edges of the piece to the wall. Alternatively, the adhesive covers the inner surface. The adhesive cures by illumination as from ultraviolet light.

7 Claims, 4 Drawing Sheets

(56) References Cited

U.S. PATENT DOCUMENTS

| | | | |
|---|---|---|---|
| 2006/0091097 A1* | 5/2006 | Cooper | B65D 23/14 |
| | | | 215/6 |
| 2012/0325402 A1* | 12/2012 | Suwa | C09J 5/06 |
| | | | 156/331.7 |
| 2016/0068718 A1* | 3/2016 | Suwa | C09J 133/08 |
| | | | 156/275.5 |
| 2017/0240782 A1* | 8/2017 | Suwa | G06F 3/044 |

* cited by examiner

GLASS WITH ATTACHED JEWEL

CROSS-REFERENCE TO RELATED APPLICATIONS

This continuation in part application claims priority to non-provisional application Ser. No. 16/705,739 filed on Dec. 6, 2019 which was a continuation application of application Ser. No. 15/633,990 filed on Jun. 27, 2017 now patented as U.S. Pat. No. 10,531,752 issued on Jan. 14, 2020 all of which have a common inventor.

BACKGROUND OF THE INVENTION

The present invention relates generally to drinkware and related items such as glassware, drinking vessels, serving pieces, serving trays, mirrors, and candle holders that are made of glass, ceramic, steel, stainless steel or plastic. The present invention relates more particularly to a device that holds a beverage, a foodstuff, or a candle that has a jewel of encrusted art ware attached to it.

From ancient times, people have just stayed a few steps ahead of thirst, hunger, and darkness. Early on people used their hands for cupping water and tearing food from its source. Later, people used crude tools to make cups and bowls from wood and stone. Around the time of the Egyptian pharaohs, metalsmiths developed various cups, plates, pots, and vessels. In the following centuries, drinkware, serving vessels, candle holders, and the like developed widely to suit various tastes.

As drinkware and related items developed, people and their leaders started using symbols. People would place their symbol or mark on drinkware so another person would avoid using it or return it if found lost. Leaders of people, starting with the nobility but moving along into corporations in the present, developed crests, symbols, and trademarks for themselves and the groups that they led. In time, such crests, symbols, and trademarks made their way onto drinkware and related items to differentiate one group from another. Some crests and symbols had bosses and other elements of bas relief when applied to a surface such as a shield. A shield so decorated would deflect blows and arrows from the bosses and other relief elements. Crests, symbols, and trademarks appeared on shields, armor, drinkware and the like through paints, dies, metalwork, and select chemical processes such as etching.

Etched glassware includes decorative designs and has its higher than average cost to manufacture and then for a present day consumer to purchase. More recently, fashion has shown favor towards attaching decorative pieces to glassware and drinking vessels as an alternative to etching.

DESCRIPTION OF THE PRIOR ART

From nothing, to paints, bosses, and bas relief, to etching, smiths and artisans of wide description have decorated drinkware and related goods using their techniques and talent. One common method to attach decorative pieces starts with taking a brooch such as a jeweled brooch, removing the clip that formerly attach the brooch to a garment, bending the brooch to approximates the curvature of a piece of drinkware, and then adhering the brooch to the side of the drinkware.

Such a process also has its time consuming aspect and higher than average cost. In this prior art method, an artisan can only work with one piece of jewelry at a time, the piece runs the risk of damaged at any point during the removal of the clip and bending which would cause scrapping of the piece. Unless the piece has its shape formed so its contour precisely matches that of the drinkware to which it attaches, the piece may not remain in place, may call for attaching again, face the risk of its breakage, or face the risk of the drinkware breaking.

The Glass with Attached Jewel overcomes the above-mentioned disadvantages and drawbacks of the prior art. The present invention therefor seeks a device and a process that allowed decorative pieces, especially jeweled or jewelry pieces of a certain fabrication so they easily attach to an item of drinkware and remain attached a long time during usage and cleaning of the drinkware. The decorated drinkware than has a resulting long wearing embellishment for all to see.

As such, the general purpose of the present invention, which will be described subsequently in greater detail, is to provide new and improved Glass with Attached Jewel which has all the advantages of the prior art mentioned heretofore and many novel features that result in Glass with Attached Jewel which are not anticipated, rendered obvious, suggested, or even implied by the prior art, either alone or in any combination thereof.

SUMMARY OF THE INVENTION

The present invention of the Glass with Attached Jewel has an item of drinkware such as a glass, optically clear adhesive, and a jewel piece. The glass has a base, a wall extending up from the base, and a rim opposite the base. The wall curves upon two axes with different radii. The piece fits upon the curved wall and the adhesive adheres the piece to the wall. The piece has an outer surface and an opposite inner surface. The inner surface has at least three pads and a plurality of dimples that receive the adhesive and provide additional surface area making for a strong bond of the piece to the glass or drinkware. The adhesive fills the gap upon the edges of the piece to the wall. Alternatively, the adhesive covers the inner surface. The adhesive cures by illumination as from ultraviolet light.

The present disclosure also discloses a method of attaching decorative pieces to glassware or drinking vessels. The drinkware primarily takes the form of stemmed and stemless wine glasses, but also includes glass or ceramic coffee mugs as well as other types of beverage holding devices. The decorative pieces include jeweled pieces, and the pieces may have a theme, such as a sports motif, a nautical motif, and the like.

The disclosed method includes the steps of cleaning the drinkware and the decorative pieces, placing a plurality of drinkware on a rack oriented to a particular type of light, applying a particular resin to the back of each decorative piece, then placing each piece on the side of an item of drinkware, and subsequently curing the resin for a predetermined period. The resin then hardens and secures the decorative piece to the side of the drinking vessel or glassware.

In a second embodiment of the invention, items of drinkware mount upon a rack and enclose a light bulb within them as a group when installed. This configuration decreases curing time to permanently affix a decorative piece to glassware and increases throughput of the decorative glassware. In addition, non-glass items also load into the rack in the same way and a set of lights have a location above the rack to radiate the light downward onto the non-glass items. For example, this embodiment has a ceramic coffee mug laying on its side and having LED UVA lights positioned an inch to several inches away.

There has thus been outlined, rather broadly, the more important features of the invention in order that the detailed description thereof that follows may be better understood and that the present contribution to the art may be better appreciated. Other attributes of the invention include shade having a socket connection to the column, shade having a flattened dome shape that sheds water, ventilation apertures in the column above the door, tabs upon the base that support a smartphone placed outside the door, and the shade and the base having spaced apart centers. Additional features of the invention will be described hereinafter, and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a glass with attached jewel that bonds the jewel upon a surface curve on two axes.

Another object is to provide such a glass with attached jewel that follows a biaxially curved surface with two radii.

Another object is to provide such a glass with attached jewel that produces a significant number of decorated glasses and drinking vessels simultaneously.

Another object is to provide such a glass with attached jewel that reduces manufacturing costs while providing a quality finished product.

Another object is to provide such a glass with attached jewel that provides a method of its manufacture economical to use.

Another object is to provide such a glass with attached jewel that may be easily and efficiently manufactured and marketed to the consuming public.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 9 provides an exploded view of the invention;

FIG. 10 shows a rear view of the jewel piece of the invention;

FIG. 11 provides an enlarged view of a portion of the jewel piece of the invention; and, FIG. 12 provides a section view through the inner surface of the jewel piece of the invention.

The same reference numerals refer to the same parts throughout the various figures.

DESCRIPTION OF THE PREFERRED EMBODIMENT

The present invention overcomes the prior art limitations by providing a Glass with Attached Jewel for decorating an item of drinkware. More particularly the drinkware has a wall curved upon two axes. The wall has its perimeter, and it spans from the stem or bottom of the drinkware upwardly to its open mouth. The drinkware has its wall curve around the perimeter suitable for gripping by a person's hand. Thus, the first axis of curvature follows the perimeter. The drinkware has its wall with a height upward from the bottom to the mouth. The wall may curve along its height. Thus, the second axis of curvature is perpendicular to the perimeter. Where the wall extends upwardly from the perimeter, it has no curvature perpendicular to the perimeter, as in a glass with an upright side. Where the wall extends upward from the perimeter and away from the perimeter, it has a curvature perpendicular to the perimeter, as in a wine glass with a curved side.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 1A:
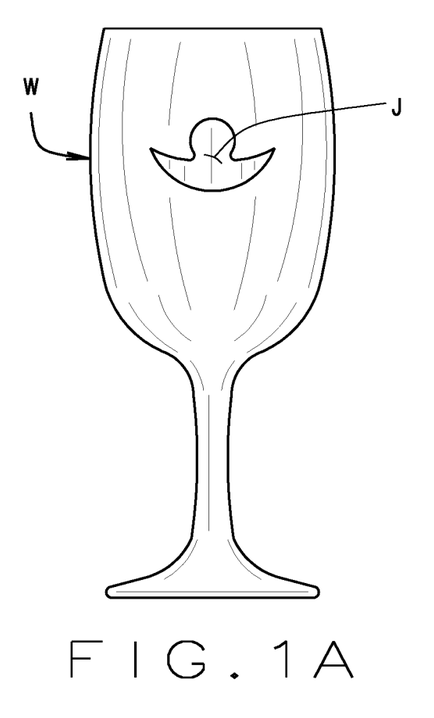
FIG. 1A is a front view of the invention.
Figure 1B:
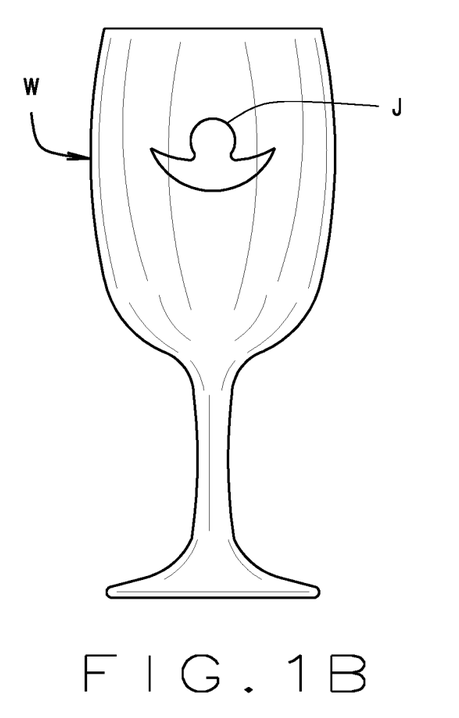
FIG. 1B is a rear view of the invention, opposite FIG. 1A.

Referring to the drawings, a stemmed wine glass—or drinkware of glass or non-glass material, glass and non-glass candle holders—indicated generally as W, has a decorative jeweled piece as at J attached to the side of the glass at its upper end as shown in FIGS. 1A-1C. FIG. 1A is a front view of a wine glass W with a decorative jeweled piece J attached to the side of the glass or drinking vessel, the glass orienting the front of a decorative piece J out of the plane of the figure towards the reader. Then FIG. 1B is a rear view of the wine glass of FIG. 1A, or other drinking vessel, the glass appears in this view as opposite from FIG. 1A and the transparent material of the glass W thus permits showing the back of the decorative piece.

Figures 2, 3:
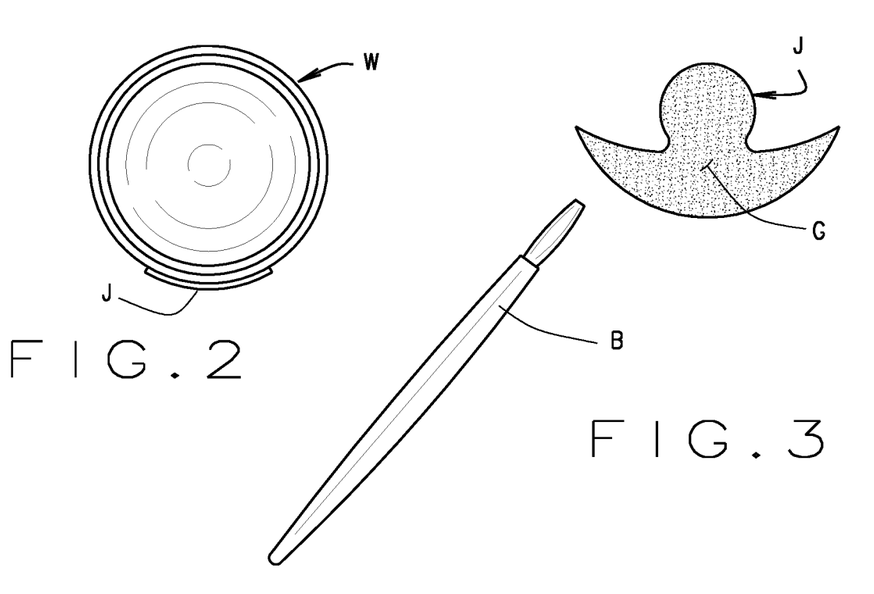
FIG. 2 is a top view of the invention.
FIG. 3 an environment view of a jewel of the invention.

FIG. 2 then has a top view of the drinkware such as glass W, or other drinking vessel and a decorative jeweled piece attached as later described. The jeweled piece may have any number of forms, shapes, and indicia including themed pieces from various collections of the Applicant and of others. As shown in the drawings and later described, the jeweled piece J has its curvature corresponding to that of the side of wineglass W with one or more jewels fitted to the outer surface of the glass W.

To make the product, first, each piece of drinkware or serving piece W is cleaned and wiped with a cloth to remove any foreign material from the outer surface of the glass. Such cleaning provides that a decorative piece J properly adheres to the outside of the glass following its attachment to the drinkware or serving piece.

Next, a plurality of drinkware W is mounted on a rack R. The rack can hold, for example, up to twenty-four pieces of drinkware W. As later shown in FIG. 4, the drinkware has a horizontal arrangement on rack R.

Next in FIG. 3, this figure illustrates application of a resin to the back of a decorative jeweled piece. Here, a glue G is applied to the back of a decorative piece J using a brush B, a sprayer (not shown), or other instrument. The glue comprises a resin which is sensitive to ultraviolet light, or UV, such as UVA for ultraviolet light A or UVB for ultraviolet light B. The entire back of a decorative piece J receives a covering of glue to achieve maximum adherence of the piece to the drinkware upon curing of the resin of the glue. After complete application of the glue to a piece J, an artisan fits the piece to an upper portion of the wall of the drinkware as shown.

Figure 4:
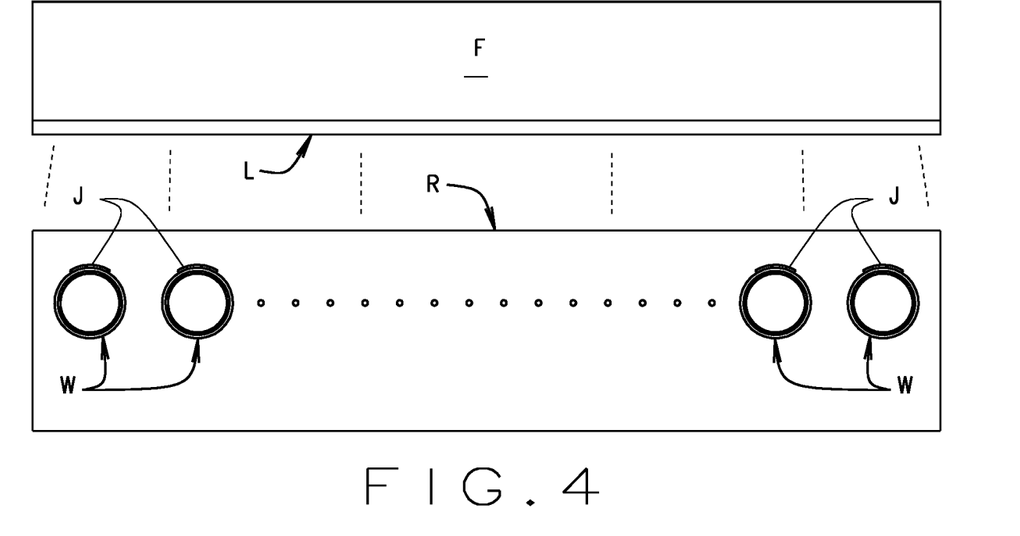
FIG. 4 is a top view of a plurality of the invention placed into a rack for curing by light.

Turning to FIG. 4, this figure illustrates a rack on which glasses are mounted and a lighting system for illuminating the glasses. The lighting system illuminates after the artisan attaches the decorative pieces to drinkware and then cures the resin affixing the decorative pieces to the drinkware W. Here, a light fixture F has its position above the rack R. Fixture F has one embodiment of an arrangement of one LED UVA light bulb for each piece of drinkware in which is installed LED UVA light bulbs L. For curing the resin, an ultraviolet light emitted by bulbs L has a wavelength in the range of 400-420 nm and this light radiates upon the drinkware W placed in the rack R and their associated decorative pieces J. An assortment of LED UVA light bulbs, manufactured by Cree® of Creeled, Inc. of Newark, CA, SemiLEDs® of Boise, ID, or LuxDrive® of LEDdynamics, Inc. of Randolph, VT, with UV wavelength from 400-420 nm has been found to be suitable for this purpose.

After all of the decorative pieces J have fitted onto the respective drinkware, the LED UVA light bulbs in fixture F are turned "on" for a predetermined period of time for light radiated from the bulb to cure the resin. This period is, for example, up to approximately five minutes. Once the resin has cured, the decorative pieces J have permanent attachment to the drinkware. Further, the cured resin has its optical clarity, meaning that as a connoisseur views the wineglass W from its side—or the back if it is glass—no distortion between the drinkware and decorative appears to the eye of the connoisseur to see.

Upon conclusion of the preceding steps, the drinkware now exits from the rack R, and undergoes a final cleaning and packaging. The decorated drinkware then ships directly to their purchaser.

Particular advantages of the method of the present invention are that a number of decorative pieces J undergo simultaneous processing with the drinkware to which they fit rather than processing one at a time. This increases throughput of the end product while saving time and labor costs. In addition, not all of the decorative pieces—fitted to drinkware and cured—require the same design. Rather, each decorative piece may have a different design than its adjacent glass so batches including a few, or a large number of pieces can be processed at the same time so to raise throughput while lowering production time and costs.

Figure 5:
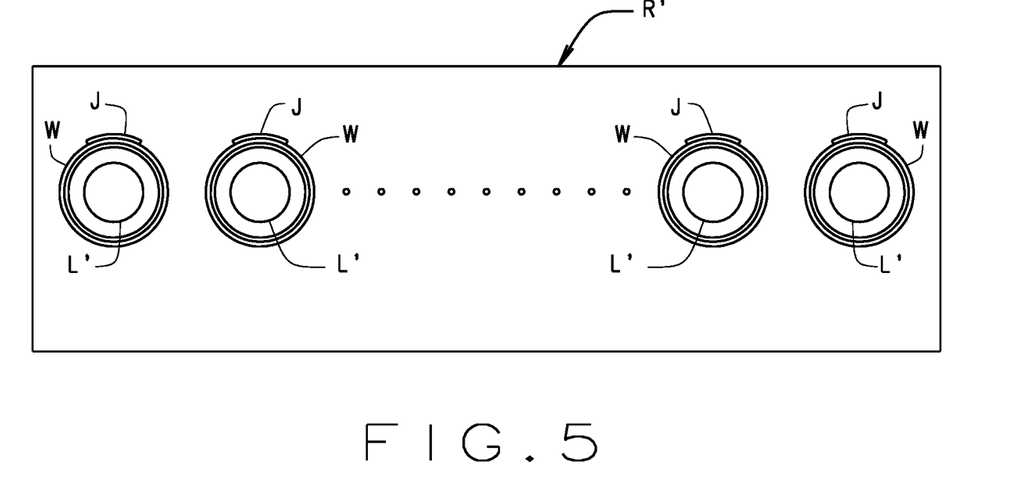
FIG. 5 is another top view of a plurality of the invention placed into an enclosure for curing by light.

Then FIG. 5 illustrates a second rack upon which glasses or drinkware mount with a separate light enclosed by the drinkware W when in place on the rack R'. This rack may receive drinkware not made of glass. For instance, for a ceramic coffee mug, the lights would have their position above the mugs and shine down to radiate the decorative piece and the outside of the mug. Here, a rack R' has its construction to hold a plurality of glasses W. Now, a separate set of LED UVA light bulbs L' illuminates each glass W separately with the bulbs L mounting on the rack and extending outwardly from it so that the glass W installed on the rack enclosed the bulbs L. With a bulb L within the inside of a glass mounted on the rack, the bulb has much closer proximity to the glassware than in the previously described embodiment. Because the light emitted by the bulb has a shorter distance to the bonding surface of the decorative piece J and its associated glass W, the curing time decreases which, in turn, increases the throughput of decorated glassware.

Figures 6, 7, 8:
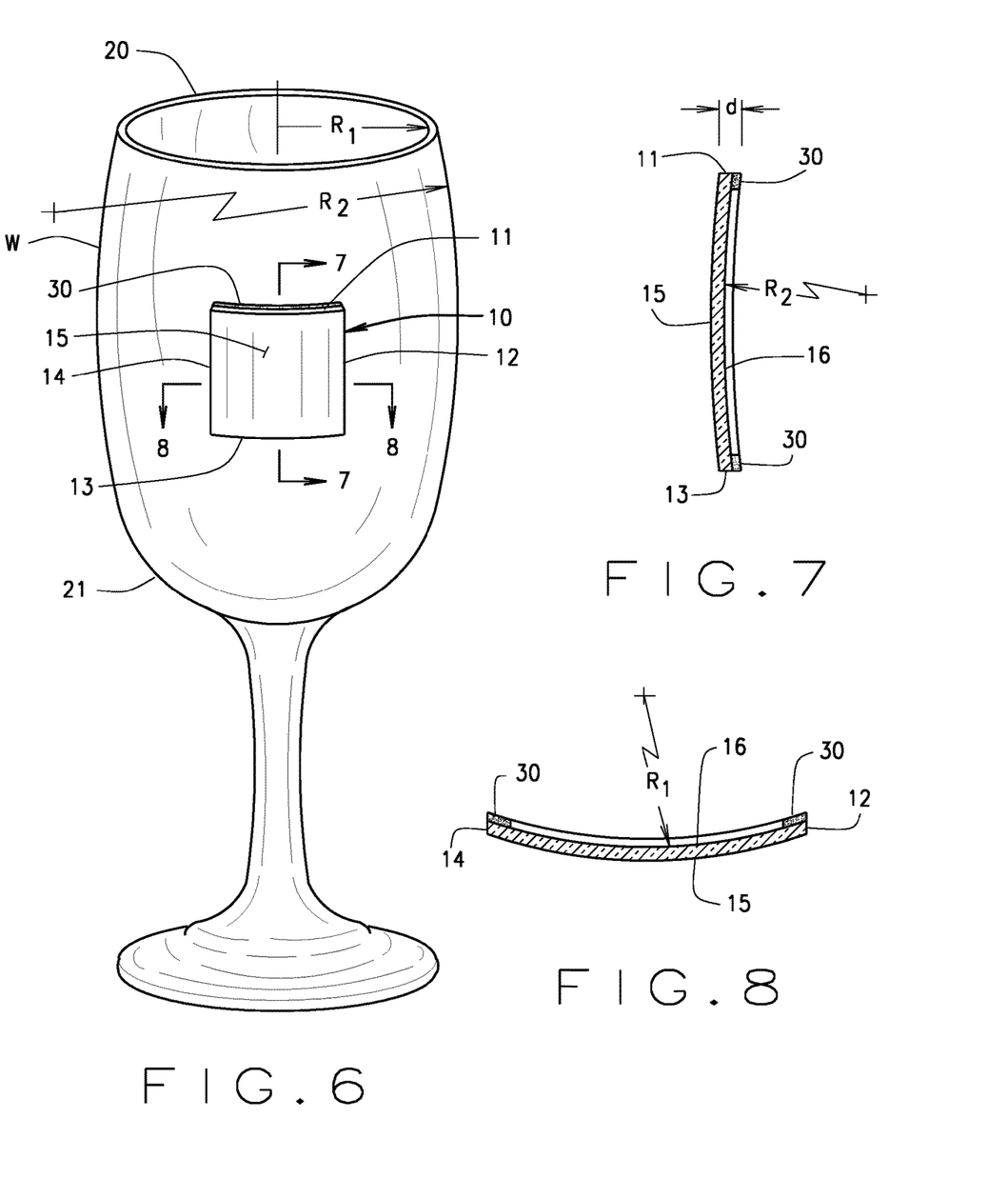
FIG. 6 describes an enlarged front view of the invention.
FIG. 7 shows a section view through the invention.
FIG. 8 shows a section view through the invention orthogonal to FIG. 7.

FIG. 6 then shows a front perspective view of the invention of the glass with attached jewel. The invention has an item of a decorated device, its drinkware W, as before. Though a rounded cup portion of a wine glass is shown, the drinkware may have various shapes and may also serve food or hold candles, much like the various parts of a service set. The drinkware has its open rim 20 and an opposite closed base 21. A wall 22 spans between the base and the rim and the wall and the base cooperatively retain beverages and other fluids poured into the drinkware. The rim has a generally round shape with its radius of $R_1$, or first radius, suitable for a user to apply his mouth during drinking a beverage. The rim's radius extends notionally from the center of the opening within the rim. Beneath the rim, the wall 22 also has its radius of curvature $R_2$. When the wall's radius of curvature as at $R_2$, or second radius, matches the rim's radius of curvature as at $R_1$, the drinkware has cylindrical form and the wall has no outward curvature, that is, no bulge. When the wall's radius of curvature as at $R_2$ exceeds the rim's radius of curvature as at $R_1$, the drinkware attains a rounded form on two axes and the wall attains an outward curvature suitable for gripping by a person's hand, for resting upon a person's index finger and thumb, and for display when not used for drinking. Typically, the wall's radius of curvature as at $R_2$ extends from a point spaced away from the center of the drinkware. As the wall's radius of curvature as at $R_2$, increases, the radius $R_2$ has a measurement point further from the drinkware.

Between the rim 20 and the base 21, the drinkware W has attached to its wall 22, a piece 10. The piece has its edges or more attached by an adhesive 30 to the wall. The drawing shows the piece 10 in a square like shape with four edges upon its perimeter. The Applicant foresees pieces of round, triangular, polygonal, rounded and other shape, that also have their own perimeters. A round shape has one edge and other shapes present additional edges thus the piece has at least one edge. Though the square shape is shown, other shapes are implied provided they have edges on their own perimeters. The piece 10 shown has its four edges starting with a top edge 11 and proceeding clockwise to a right edge 12 then to a bottom edge 13 opposite the top edge, and then to a left edge 14 opposite the right edge. In the preferred embodiment, the adhesive 30 follows the four edges, 11, 12, 13, 14, and provides a firm bond of the piece 10 to the drinkware W so that the piece resists gravity, remains attached for many years, and withstands cleaning solvents and processes. Outwardly from the four edges, the piece 10 has its outer surface 15 here shown curved upon two radii to follow the surface or wall 22 of the drinkware W, or glass. The outer surface has an orientation away from the wall. Though the piece 10 has its square shape shown, the Applicant foresees other shapes and surface textures. The adhesive has a medium to high viscosity such as that by the C. R. Laurence company of Los Angeles, California.

FIG. 7 provides a section view through the jewel piece 10 and adjacent adhesive 30. This view is along a line generally extending from near the rim 20 to near the base 21. The piece 10 has its outer surface 15 shown towards the left of the figure and an opposite inner surface 16 shown towards the right of the figure. The inner surface has its orientation towards the wall 22. Along this section the inner surface follows the wall's radius $R_2$. The piece 10 has its top edge 11 and mutually spaced apart bottom edge 13 here shown towards the top and the bottom of the figure. Near the top edge 11 and the bottom edge 13, the invention has adhesive 30 applied to the inner surface 16. The adhesive has a material that undergoes curing by ultraviolet light, either UVA or UVB, resulting in a finished optically clear appearance. The adhesive has an optically clear resin that a person holding the drinkware W does not see and yet the adhesive retains the piece 10 upon the drinkware W. In this embodiment, the adhesive has application in elongated strip form, that is, strips along the four edges, this figure showing along the top and bottom edges. The adhesive fills a gap between the wall 22 and the inner surface 16. The gap has its thickness shown as at d that ranges from about 0.05 millimeters to about 0.1 millimeters. Also, the adhesive has a tensile strength that supports attachment of the jewel piece along its edges.

Then, FIG. 8 provides a section view through the jewel piece 10 and adjacent adhesive 30 along a line perpendicular to that of FIG. 7. This view is along a line generally extending parallel to the rim 20. The piece 10 has its outer surface 15 in this figure towards the top and the opposite inner surface 16 towards the bottom of this figure. Along this section the inner surface follows the rim's radius $R_1$. The piece 10 has its right edge 12 and mutually spaced apart left edge 14 here shown towards the right and left of the figure, respectively. Near the right edge 12 and the left edge 14, the invention has ultraviolet light cured adhesive 30 applied that attains an optically clear appearance. In this embodiment, the adhesive has application in strips along the four edges, this figure showing along the top and bottom edges. The jewel piece follows $R_1$ and $R_2$ as it abuts the wall 22, preferably smoothly and continuously so the piece conceals the adhesive within it, that is, a user does not see it during usage of the item or drinkware. Each of the radii, $R_1$ and $R_2$ extends outwardly from an axis and hence the jewel piece follows two axes.

Figures 9, 10, 11, 12:
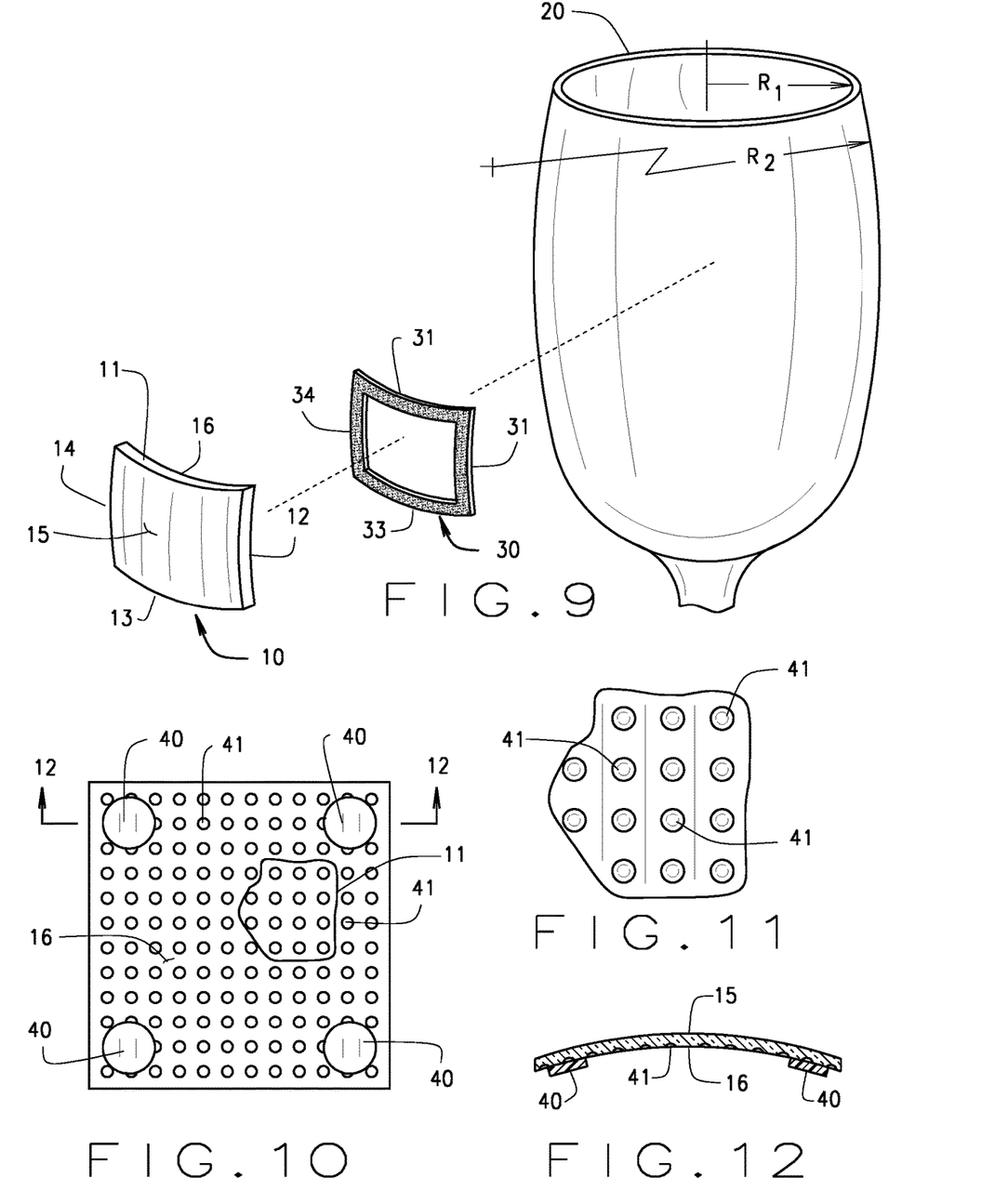

Turning to FIG. 9, the invention appears in an exploded view with the drinkware W to the right and showing the upper portion of it with the wall 22. Outwardly from the wall 22 towards the left in the figure, the invention has its adhesive 30. In this embodiment, the adhesive applies in four strips as at 31, 32, 33, 34 that follow the four edges of the piece. The strips include a top strip 31 and a mutually spaced apart bottom strip 33, a right strip 32 and a mutually parallel and spaced apart left strip 34. The right strip and the left strip are perpendicular to the top strip 31 as shown. The strips have a width markedly less than their lengths as shown. The strips fill the gap previously described of depth d in FIG. 7. Outwardly from the adhesive 30 to the left, the invention has the jewel piece 10 with its outer surface 15 shown and the opposite inner surface 16 concealed. The piece 10 has its top edge 11, bottom edge 13, right edge 12 and left edge 14 as before. The top edge and bottom edge have a mutually spaced apart orientation as shown. The right edge and the left edge are perpendicular to the top edge. Though a square shape is shown and described, the Applicant foresees other shapes for the piece 10. This figure shows that the adhesive 30 follows the edges of the piece in this embodiment. The adhesive makes a solid bond to the wall 22 and to the inner surface 16. In an alternate embodiment, the adhesive coats the inner surface. That coating places adhesive upon the dimples, pads, and interstices of the inner surface.

Looking at the jewel piece itself, FIG. 10 shows a rear view of the piece 10 with the inner surface 16 shown. The inner surface has the shape of the piece 10, here shown as square though other shapes are foreseen. The inner surface in this shape has four corners. In other shapes, corners may not be present. The inner surface has at least three pads 40, this figure shows four pads. The pads here have positions near each corner to promote stronger bonding of the piece to the wall 22 by the adhesive 30. The pads provide additional surface area and roughness to which the adhesive migrates under capillary action, heat, and ventilation. Bonding to the additional surface area provided by the pads, the adhesive has a firm grip upon the piece. In this embodiment, the pads have a round shape as it disperses adhesive to optimal additional surface area. The Applicant foresees the pads having other shapes suitable to the shape of a piece, such as rectangular or arcuate for a curved piece. The pads may take the form of a flat portion of the inner surface, a curved portion of the inner surface, a flexible, distressed surface, such as felt, itself adhered to the inner surface, a flexible, distressed surface, such as felt, itself swaged into compartments of the inner surface, and the like.

Upon the inner surface of the piece and in between the pads, the piece 10 has a plurality of dimples 41 recessed into the inner surface. Each dimple has its own diameter, that is, width, generally markedly smaller than the width of a pad, and its own depth at least 10% of its diameter. The inner surface has an abundance of dimples upon it that promotes flow of adhesive when not cured and when cured a strong bond of the adhesive to the piece. The dimples have positions away from the pads. The dimples and pads cooperate to provide more surface area to the adhesive.

Here the inner surface shows its dimples 41 in excess of 100 dimples per piece. In this figure, the dimples fill the portion of the inner surface shown. As the plurality of dimples increases upon the inner surface, the diameter of each dimple decreases noticeably. This is shown in the equation:

$$d < 2\sqrt{\left(\frac{A}{N\pi}\right)} \qquad \text{Equation 1}$$

where we have these variables:
A area of piece;
d width of a dimple;
N number of dimples.
Thus, the width of a dimple, generally its diameter, has an inverse relationship to the root of number of dimples. The width of the dimple has a direct relationship to the root of the area of the piece. In an alternate embodiment, the adhesive fits between the pads, into the dimples, and through the interstices of the inner surface so the edges 11, 12, 13, 14 abut the wall, thus concealing the adhesive for a user grasping the drinkware during its usage.

FIG. 11 then provides an enlarged view of the inner surface 16 with the dimples 41 spaced apart and into the plane of the inner surface and this figure. The enlargement occurs because the dimples 41 exceed 100 in number per piece.

And, FIG. 12 shows a section view of the inner surface 16 between pads 40. The inner surface has its dimples 41 spaced apart and into the plane of the inner surface. The dimples space between the pads. In an alternate embodiment, the dimples have positions behind select pads.

In view of the above, it will be seen that the several objects and advantages of the present disclosure have been achieved and other advantageous results have been obtained. From the aforementioned description, a glass with attached jewel has been described. The glass with attached jewel device is uniquely capable of securing a decorative item upon a drinkware curved upon two axes. The glass with attached jewel and its various components may be manufactured from many materials, including but not limited to, vinyl, polymers, such as nylon, polypropylene, polyvinyl chloride, high density polyethylene, polypropylene, ferrous and non-ferrous metals, their alloys, foils, and composites. While the above description has referred to stemmed wine glasses, those skilled in the art will appreciate that the invention may also see use with stemless wine glasses, glass swingtop bottles, pilsner glasses, high ball glasses and glass coffee mugs. Also, the invention may have application with plastic drinking vessels, drinkware, drinking vessels, serving pieces, serving trays, mirrors, and candle holders that are made of glass, ceramic, steel, stainless steel, or plastic.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A decorated device, said decorated device holding one of a beverage, a food, or a candle, comprising:
   an item having a surface curved upon two axes;
   a jewel piece;
   an optically clear adhesive joining said jewel piece to said surface of said Item;
   said surface of said item being a wall;
   said jewel piece having an outer surface oriented away from said wall and an opposite inner surface oriented toward said wall;
   said inner surface receiving said adhesive;
   said inner surface having at least three pads upon it;
   a plurality of dimples upon said inner surface away from said at least three pads; and
   wherein said at least three pads and said plurality of dimples cooperatively Increase the available area for said adhesive to bond said jewel piece to said wall.

2. A decorated device, said decorated device holding one of a beverage, a food, or a candle, comprising:
   a jewel piece having an outer surface exposed outward from said device, an opposite inner surface, and at least one edge upon a perimeter of said jewel piece;
   an item having a surface curved upon two axes, said surface of said item being a wall;
   an optically clear adhesive upon said inner surface of said jewel piece and joining said jewel piece to said wall;
   said outer surface orienting away from said wall and said inner surface orienting towards said wall;
   said inner surface of said jewel piece fitting smoothly continuous to said wall;
   said inner surface having at least three pads upon it;
   a plurality of dimples upon said inner surface away from said at least three pads;
   wherein said at least three pads and said plurality of dimples cooperatively increase the available area for said adhesive to bond said jewel piece to said wall; and
   said optically clear adhesive being cured by illumination.

3. The decorated device of claim 2 further comprising:
   said optically clear adhesive bonding to said at least three pads and to said plurality of dimples within said inner surface;
   said jewel piece abutting said wall and retaining said optically clear adhesive within said at least one edge; and
   said optically clear adhesive being cured by ultraviolet light.

4. The decorated device of claim 3 further comprising:
   each of said plurality of dimples having a width less than a width of one of said at least three pads;
   said plurality of dimples exceeding one hundred in number; and wherein said optically clear adhesive is concealed outward of said wall.

5. A decorated device, said decorated device holding one of a beverage, a food, or a candle, comprising:

a jewel piece having an outer surface exposed outward from said device, an opposite inner surface, and at least one edge upon a perimeter of said jewel piece;

an item having a surface curved upon two axes, said surface of said item being a wall;

an optically clear adhesive upon said inner surface of said jewel piece and joining said jewel piece to said wall;

said outer surface orienting away from said wall and said inner surface orienting towards said wall;

said inner surface of said jewel piece fitting smoothly continuous to said wall;

said item being a glass adapted to hold a beverage;

said glass having a rim, an opposite base, and said wall spanning between said base and said rim;

said glass having a first radius as of said rim and a second radius as of said wall, wherein said second radius exceeds said first radius;

said jewel piece following said first radius and said second radius and abutting said wall between said rim and said base;

said optically clear adhesive being a coating applied to said inner surface within said at least one edge and between said item and said jewel piece;

said inner surface having at least three pads upon it;

a plurality of dimples upon said inner surface away from said at least three pads;

wherein said at least three pads and said plurality of dimples cooperatively Increase the available area for said adhesive to bond said jewel piece to said wall;

said optically clear adhesive bonding to said at least three pads and to said plurality of dimples within said inner surface;

said jewel piece abutting said wall and retaining said optically clear adhesive within said at least one edge wherein said optically clear adhesive is concealed outward of said wall; and said optically clear adhesive being cured by one of ultraviolet light A and ultraviolet light B, wherein said inner surface attaches said jeweled piece to said wall.

6. A decorated device, said decorated device holding one of a beverage, a food, or a candle, comprising:

an item having a surface curved upon two axes, said surface of said item being a wall;

a jewel piece having an outer surface oriented away from said wall and an opposite inner surface oriented to said wall;

an optically clear adhesive joining said jewel piece to said surface of said item;

said inner surface receiving said adhesive;

said inner surface having at least three pads upon it and a plurality of dimples upon said inner surface away from said at least three pads, wherein said at least three pads and said plurality of dimples cooperatively increase the available area for said adhesive to bond said jewel piece to said wall;

said optically clear adhesive having one of an elongated strip form and a coating applied between said item and said jewel piece;

said optically clear adhesive being cured by one of ultraviolet light A and ultraviolet light B, wherein said inner surface attaches said jeweled piece to said wall;

said optically clear adhesive bonding to said at least three pads and to said plurality of dimples within said inner surface;

said jewel piece abutting said wall and retaining said optically clear adhesive within said at least one edge;

each of said plurality of dimples having a width less than a width of one of said at least three pads;

said plurality of dimples exceeding one hundred in number; and said jewel piece abutting said wall and retaining said optically clear adhesive within said at least one edge wherein said optically clear adhesive is concealed outward of said wall.

7. The decorated device of claim 6 further comprising:

said item being a glass adapted to hold a beverage;

said glass having a rim, an opposite base, and said wall spanning between said base and said rim;

said glass having a first radius as of said rim and a second radius as of said wall, wherein said second radius exceeds said first radius;

said jewel piece following said first radius and said second radius and abutting said wall between said rim and said base; and said optically clear adhesive being a coating applied to said inner surface within said at least one edge and between said item and said jewel piece.

* * * * *